US012746502B2

(12) United States Patent
Knowles

(10) Patent No.: US 12,746,502 B2
(45) Date of Patent: Sep. 29, 2026

(54) AIR CONDITIONING AND FILTRATION SYSTEM

(71) Applicant: Work Air Technologies Pty, Ltd, Wangara (AU)

(72) Inventor: Gregory Brian Knowles, Wangara (AU)

(73) Assignee: Work Air Technologies Pty Ltd, Wangara (AU)

( * ) Notice: Subject to any disclaimer, the term of this patent is extended or adjusted under 35 U.S.C. 154(b) by 1035 days.

(21) Appl. No.: 17/781,034

(22) PCT Filed: Nov. 30, 2020

(86) PCT No.: PCT/AU2020/051301
§ 371 (c)(1),
(2) Date: May 30, 2022

(87) PCT Pub. No.: WO2021/102525
PCT Pub. Date: Jun. 3, 2021

(65) Prior Publication Data

US 2023/0356137 A1 Nov. 9, 2023

(30) Foreign Application Priority Data

Nov. 30, 2019 (AU) ................................ 2019904535

(51) Int. Cl.
*B01D 45/16* (2006.01)
*B01D 46/24* (2006.01)
(Continued)

(52) U.S. Cl.
CPC ............ *B01D 50/20* (2022.01); *B01D 45/16* (2013.01); *B01D 46/2411* (2013.01);
(Continued)

(58) Field of Classification Search
CPC .... B01D 50/20; B01D 45/16; B01D 46/2411; B01D 46/4227; B01D 46/62; B01D 53/02;
(Continued)

(56) References Cited

U.S. PATENT DOCUMENTS 3,954,621 A * 5/1976 Etani ...................... B01D 35/12 210/167.14
4,344,356 A 8/1982 Casterton et al.
(Continued)

FOREIGN PATENT DOCUMENTS

CN 104728945 B 9/2017
CN 108189643 A 6/2018
(Continued)

OTHER PUBLICATIONS

International Search Report by the Australian Patent Office corresponding to International Application No. PCT/AU2020/051301, dated Mar. 17, 2021. (5 pages).
(Continued)

*Primary Examiner* — Dung H Bui
(74) *Attorney, Agent, or Firm* — Maginot, Moore & Beck, LLP

(57) ABSTRACT

An air conditioning and filtration system (10) comprising a pre-treatment system (12) for initially filtering air drawn from an external environment; pressurisation means (50) for positively pressurising air filtered by the pre-treatment system (12) and at least one circulation means (106). Each circulation means (106) draws air from the external environment through the pre-treatment system (12) and pressurisation means (50) as well as air from at least one enclosed area (1) for combination into an air stream. The air stream is thereafter directed to at least one set of filtration means (94) and air conditioning means (96) before being
(Continued)

conveyed to at least one of the at least one enclosed areas (1).

12 Claims, 4 Drawing Sheets

(51) Int. Cl.

| | |
|---|---|
| ***B01D 46/42*** | (2006.01) |
| ***B01D 46/62*** | (2022.01) |
| ***B01D 50/20*** | (2022.01) |
| ***B01D 53/02*** | (2006.01) |
| ***F24F 8/108*** | (2021.01) |
| ***F24F 8/183*** | (2021.01) |

(52) U.S. Cl.
CPC ......... *B01D 46/4227* (2013.01); *B01D 46/62* (2022.01); *B01D 53/02* (2013.01); *F24F 8/108* (2021.01); *F24F 8/183* (2021.01); *B01D 2253/102* (2013.01); *B01D 2257/302* (2013.01); *B01D 2257/406* (2013.01); *B01D 2257/7025* (2013.01); *B01D 2258/012* (2013.01); *B01D 2273/30* (2013.01); *B01D 2279/20* (2013.01); *B01D 2279/30* (2013.01); *B01D 2279/40* (2013.01)

(58) Field of Classification Search
CPC ........ B01D 2253/102; B01D 2257/302; B01D 2257/406; B01D 2257/7025; B01D 2258/012; B01D 2273/30; B01D 2279/20; B01D 2279/30; B01D 2279/40; B01D 27/14; B01D 46/56; B01D 2257/30; B01D 2257/702; B01D 2258/01; F24F 8/108; F24F 8/183; F24F 3/04; F24F 8/95; F24F 2003/003; F24F 3/16; F24F 13/28; F24F 2013/205; F24F 2221/36; Y02C 20/20; B60H 1/00378; B60H 3/0641; B60H 1/00514; B60H 2003/065
See application file for complete search history.

(56) References Cited

U.S. PATENT DOCUMENTS

| | | | | |
|---|---|---|---|---|
| 4,531,453 | A | 7/1985 | Warman et al. | |
| 5,192,343 | A * | 3/1993 | Henry | B01D 46/62 96/402 |
| 5,403,383 | A * | 4/1995 | Jaisinghani | B03C 3/155 95/79 |
| 5,665,143 | A * | 9/1997 | Jarvis | F24F 8/158 95/96 |
| 8,597,391 | B1 * | 12/2013 | Dietz | B01D 46/0056 55/482 |
| 2010/0267540 | A1 * | 10/2010 | Babb | B01D 45/16 494/59 |
| 2012/0108156 | A1 * | 5/2012 | Himanen | B60H 3/0633 55/385.3 |
| 2013/0074460 | A1 * | 3/2013 | Sakuragi | B01D 46/42 55/471 |
| 2014/0216257 | A1 | 8/2014 | Knowles | |
| 2015/0343366 | A1 * | 12/2015 | Wuebbeling | B01D 46/0002 55/346 |
| 2016/0129384 | A1 * | 5/2016 | Schulz | B01D 46/60 55/482 |
| 2016/0258392 | A1 * | 9/2016 | Harris | B01D 46/64 |
| 2019/0299154 | A1 * | 10/2019 | Meirav | B01D 53/0462 |
| 2020/0289973 | A1 * | 9/2020 | Salehpoor | B01D 53/145 |
| 2021/0164173 | A1 * | 6/2021 | Berning | B01D 46/58 |

FOREIGN PATENT DOCUMENTS

| | | | |
|---|---|---|---|
| JP | H08108024 | A | 4/1996 |
| JP | 2017127836 | A | 7/2017 |
| JP | 2018-008224 | A | 1/2018 |
| JP | 2018069134 | A | 5/2018 |
| WO | 2012001095 | A1 | 1/2012 |

OTHER PUBLICATIONS

Written Opinion by the Australian Patent Office corresponding to International Application No. PCT/AU2020/051301, dated Mar. 17, 2021. (4 pages).

* cited by examiner

AIR CONDITIONING AND FILTRATION SYSTEM

This application is a U.S. national phase of PCT Application No. PCT/AU2020/051301 filed on Nov. 30, 2020, which claims priority to Australian Patent Application No. 2019904353 filed on Nov. 30, 2019, which is incorporated herein by reference in its entirety.

FIELD OF THE INVENTION

The invention relates to an air conditioning and filtration system for at least one enclosed area. The invention is particularly suited for use in situations where the enclosed area is the cabin of heavy equipment vehicles, such as construction and mining equipment, that are exposed to asbestos fibres or other airborne contaminants as part of their ordinary operating environment.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Air conditioning/heating systems, such as those found on most mobile equipment, rely on a vacuum being created to draw air through the evaporator/heater cores. However, the creation of this vacuum inherently leads to the ingress of airborne contaminants, including dust.

To try and minimise this from occurring, such systems also employ extensive sealing structures. These sealing structures have proven to be difficult to adequately maintain.

A partial solution to this problem has been to introduce filtration systems to try and capture those contaminants that manage to enter the system. A further issue with the use of prior filtration systems is that they work off the assumption that the airborne contaminants are only entering the system by way of the air drawn from the external environment. As such, they focus the filtration on the external intake at the expense of the system as a whole.

By also focusing the filtration on the external intake, the filters employed at the external intake are subject to clogging. When used on mobile equipment that operate almost continuously, this means that the filters may rapidly clog, resulting in more downtime for the mobile equipment to facilitate replacement of the filters.

A further issue with this approach is that it does not allow for the air conditioning and filtration system to be implemented across a range of housings that each have their own conditioning and filtration requirements. While this issue has been persistent for some years, the more recent commercial uptake of autonomous vehicles makes this problem even more pronounced in today's market as there is a need for an operator cabin and a separate autonomous system housing.

It is therefore an object of the present invention to provide a system which overcomes, or at least ameliorates in part, one or more of the abovementioned problems.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the present invention there is an air conditioning and filtration system comprising:

- a pre-treatment system for initially filtering air drawn from an external environment;
- pressurisation means for positively pressurising air filtered by the pre-treatment system;
- at least one circulation means, each circulation means operable to draw air from the external environment through the pre-treatment system and pressurisation means and air from at least one enclosed area and combine it into an air stream, the air stream thereafter being directed to at least one combination of filtration means and air conditioning means before being conveyed to at least one of the at least one enclosed areas.

The air conditioning and filtration system may include at least one additional filtration means, the at least one additional filtration means operable to filter positively pressurised air before the positively pressurised air reaches the at least one circulation means. The at least one additional filtration means may take the form of one or more filtration cartridges, each filtration cartridge operable to filter out a specific contaminant, such as sulphur dioxide, ammonia, methane or diesel particulate. In a preferred form, each filtration cartridge can be removed from its installed position in a third chamber.

In an alternative configuration, the at least one additional filtration means includes at least one downstream filter, each downstream filter operable to further filter the positively pressurised air after the positively pressurised air has been filtered by one or more filtration cartridges. The downstream filter may be a high performance filter, an active carbon filter, an ultra low penetration filter or a coarse liner filter. In a preferred form, the downstream filters are all drum filters.

Each combination of filtration means and air conditioning means may be housed in a stackable housing and where, when stacked, the stackable units are in fluid communication with a head housing by way of a common air conduit, the head housing operable to house at least the pre-treatment system and the pressurisation means.

BRIEF DESCRIPTION OF THE DRAWINGS

The invention will now be described, by way of example only, with reference to the accompanying drawings, in which.

DEFINITIONS

Figure 1:
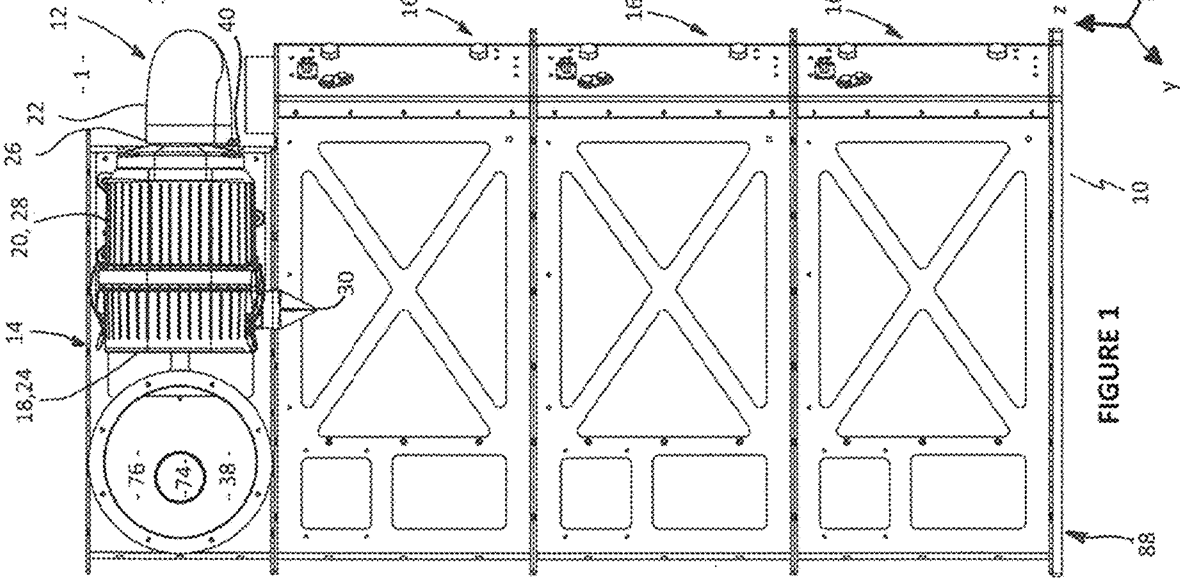
FIG. 1 is a rear external view of an air conditioning and filtration system according to a first embodiment of the invention.
Figure 4:
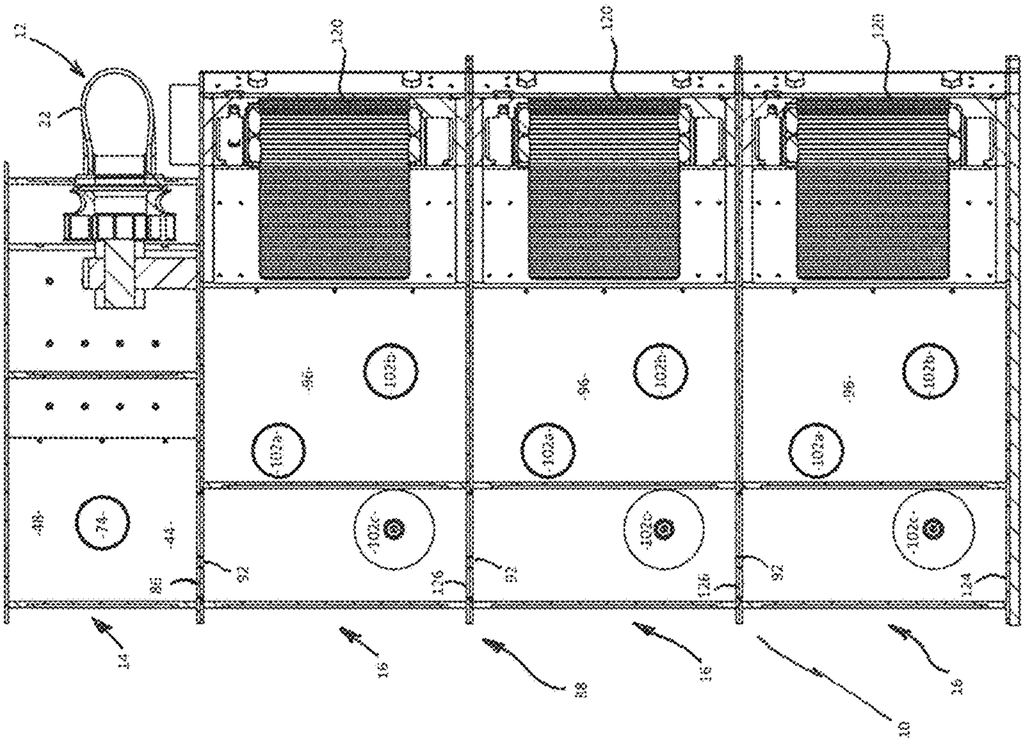
FIG. 4 is a rear cross-sectional view of the air conditioning and filtration system as shown in FIG. 1.

In this specification, the axes x, y and z are references to the directions as shown by the reference axes as depicted in FIG. 1. With this in mind, a reference to length is a reference to size along the x axis; a reference to width is a reference to size along the y axis; and a reference to height is a reference to size along the z axis.

PREFERRED EMBODIMENTS OF THE INVENTION

In accordance with a first embodiment of the present invention there is an air conditioning and filtration system 10 for at least one enclosed area 1. In this embodiment, the enclosed areas 1 are: (a) the cabin of a heavy equipment vehicle (not shown); and (b) the equipment housing of the heavy equipment vehicle.

The air conditioning and filtration system 10 comprises a pre-treatment system 12, first housing 14 and a plurality of second housings 16 as shown in FIG. 1. The plurality of second housings 16 are designed so as to be capable of being stacked one on top of another. The first housing 14 is designed so as to be mounted on the stack of second housing 16.

The pre-treatment system 12 comprises an atmospheric air inlet 18, a cyclonic filtration system 20 and flexible conduit 22. The atmospheric air inlet 18 is in fluid communication with the cyclonic filtration system 20 at a first end 24. Similarly, the flexible conduit 22 is in fluid communication with the cyclonic filtration system 20 at a second end 26.

The cyclonic filtration system 20 comprises a plurality of small cyclonic particle separators 28 and a nozzle 30. The cyclonic particle separators 28 are arranged such that air received by way of the atmospheric air inlet 18 is distributed to one of the cyclonic particle separators 28. The cyclonic particle separator 28 is of standard configuration as would be known to the person skilled in the art and therefore will not be described in more detail here.

Air processed by the cyclonic particle separator exits to the flexible conduit 22. Contaminants removed by the centrifugal forces of the cyclonic particle separator 28 are directed to the nozzle 30.

The first housing 14 has an internal area 34. The first housing 14 has a pre-filtered air inlet 36 and a recirculating air inlet 38. The pre-filtered air inlet 36 allows air travelling through the flexible conduit 22 to enter the internal area 34 at a first side 40. The recirculating air inlet 38 allows air drawn from the enclosed area 1 to enter the internal area 34 at a second side 42.

The internal area 34 is divided into a plurality of chambers 44. Specifically, the pre-filtered air inlet 36 provides access to first chamber 46. Similarly, recirculating air inlet 38 provides access to second chamber 48.

The first chamber 46 has a pressurisation fan 50. The pressurisation fan 50 is positioned such that air passing through pre-filtered air inlet 36 must pass through the pressurisation fan 50. Air pressurised by the pressurisation fan 50 is expelled into the first chamber 46 by the generated centrifugal forces.

Third chamber 52 has a plurality of ledges 54 provided therein. Each ledge 54 extends about three sides of the internal periphery of the third chamber 52. In this manner, each ledge 54 is substantially “U”-shaped. The ledges 54 are each parallel to one another relative to the z axis.

Figure 5:
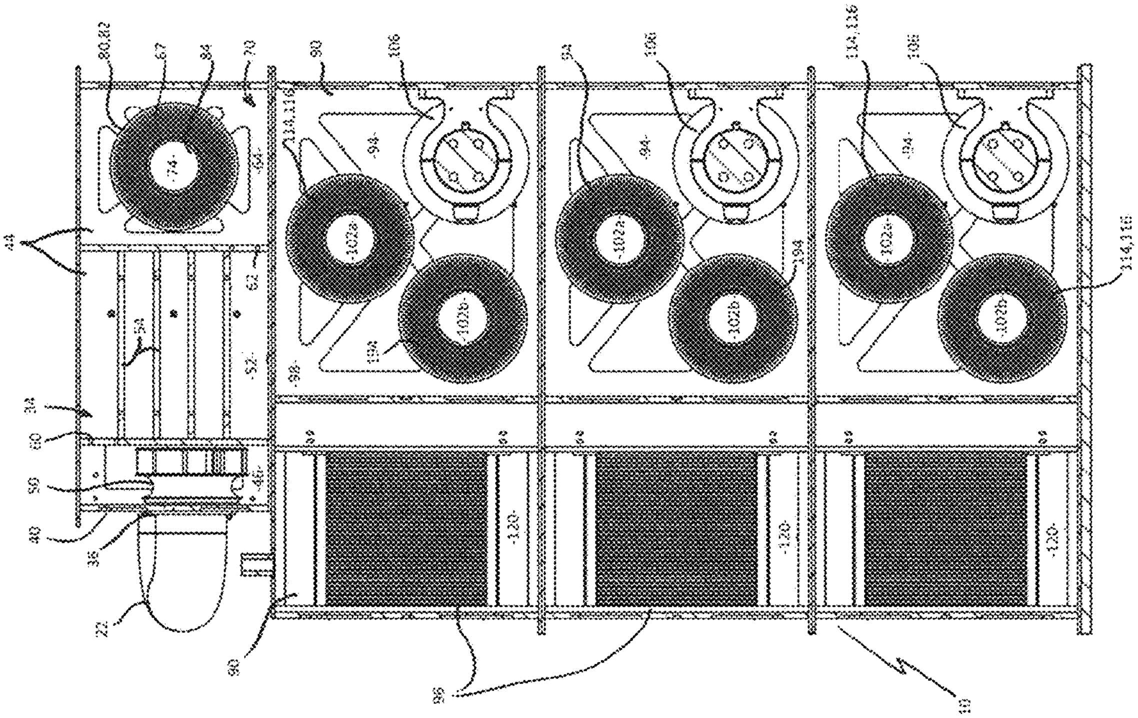
FIG. 5 is a front external view of the air conditioning and filtration system as shown in FIG. 1.
Figure 7:
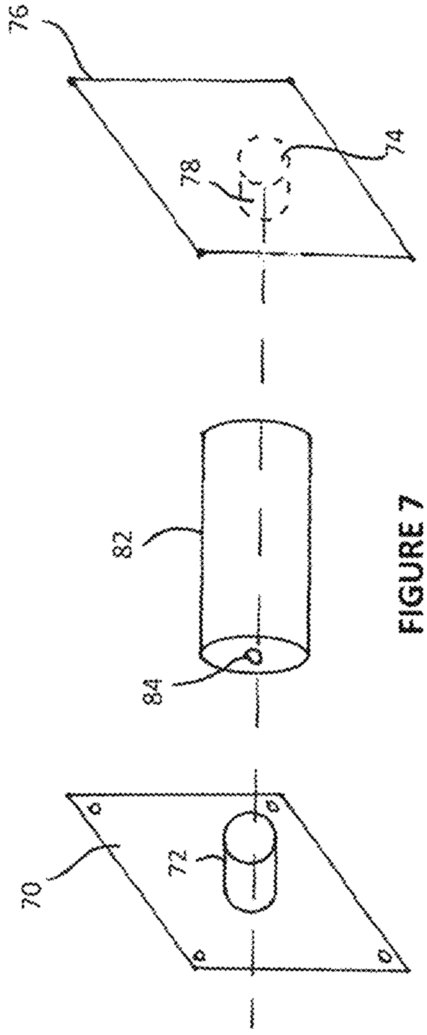
FIG. 7 is an illustrative exploded view of a downstream filter means forming part of a head housing as shown in FIGS. 1 to 5.
Figure 6:
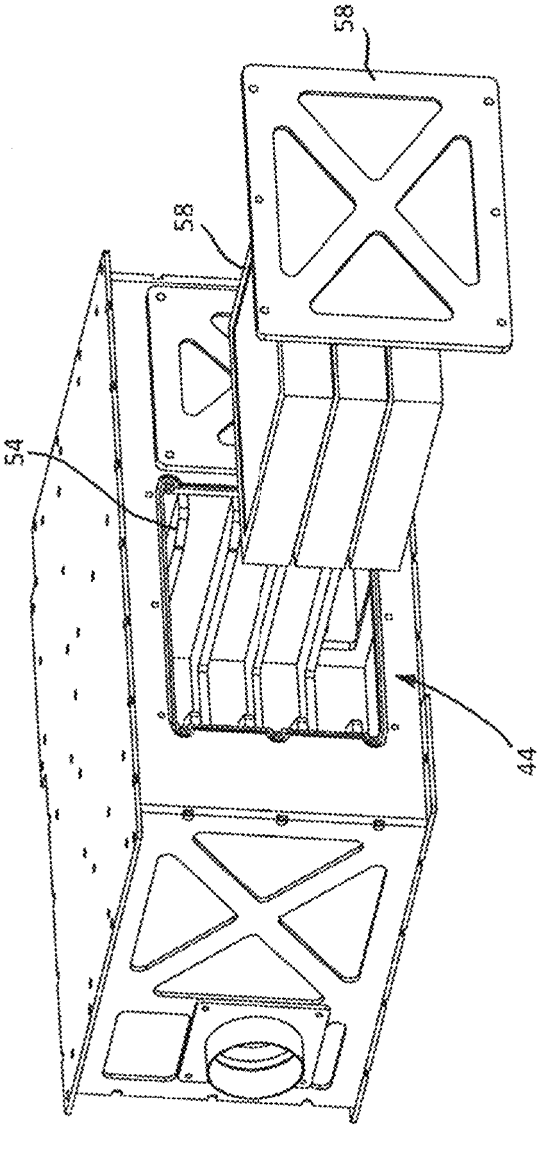
FIG. 6 is an isometric view of part of an additional filtration means forming part of a head housing as shown in FIG. 1 illustrating a removable filtration cartridge system.
Figure 8:
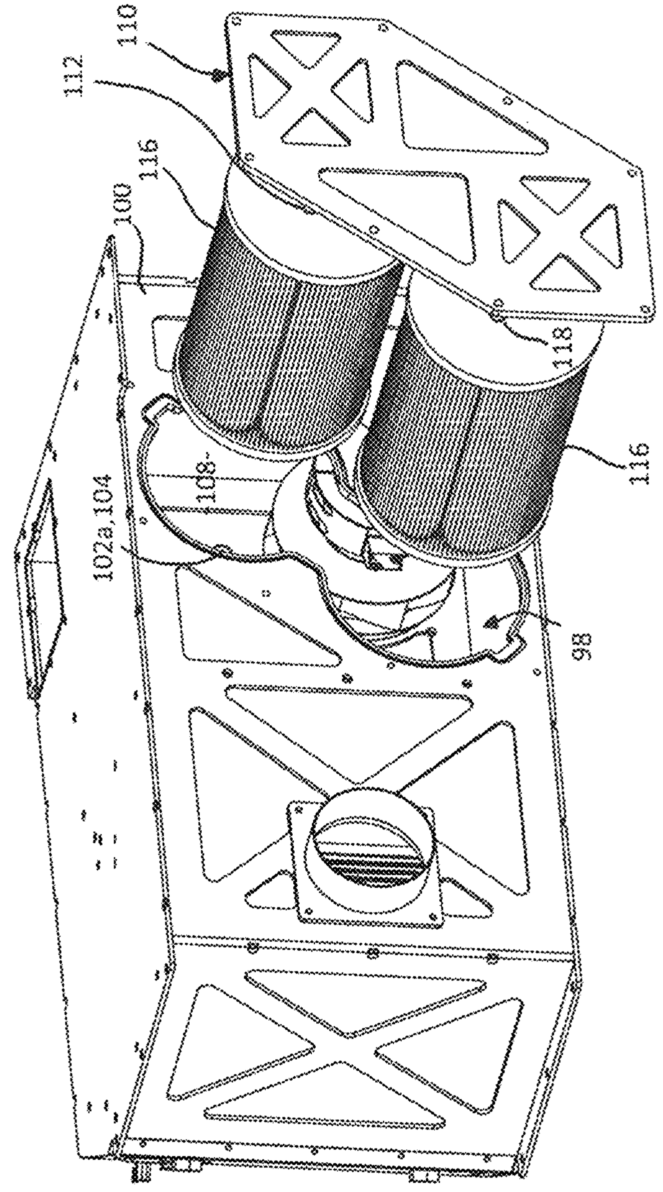
FIG. 8 is a partial exploded view of filtration means forming part of a stackable housing as shown in FIGS. 1 to 5.

In this embodiment as shown in FIG. 5, there are four ledges 54. Furthermore, side 56 of third chamber 52, being the side which does not have part of the ledge 54 attached thereto, takes the form of a removable plate 58.

The ledges 54 are equally spaced along the Z-axis within the third chamber 52. In this manner, filtration cartridges 59 can be interchangeably installed therein as will be discussed in more detail below.

Each filtration cartridge is of slightly smaller width and length as the length and width of the third chamber 52. In this manner, each filtration cartridge in effect takes up the whole xy plane within the third chamber 52. This also allows each filtration cartridge to be retained in place by way of its respective ledge 54.

In this embodiment, a single filtration cartridge is used. The single filtration cartridge is a honeycomb filter designed to filter sulphur dioxide ($SO_2$).

Diagonally opposite a pressurisation inlet 60 is a filtration inlet 62. Air that passes through filtration cartridges exits the third chamber 52 by way of filtration inlet 62. The filtration inlet 62 also acts as an entrance way to fourth chamber 64.

The fourth chamber 64 has a cut-away side 66. The cut-away side 66 is adjacent side 56. The cut-away side 66 has a substantially circular aperture 67 provided therein. Releasably attached to the cut-away side 66 is a removable plate 68.

The removable plate 68 has an interior side 70. The interior side 70 has a first circular projection 72 extending centrally therefrom.

An aperture 74 is provided in side 76 of the fourth chamber 64. The aperture 74 connects the fourth chamber 64 to the second chamber 48.

Surrounding the aperture 74 is a second circular projection 78. The first circular projection 72 and second circular projection 78 are of equal diameter and in vertical and horizontal alignment with one another.

Enclosed within the fourth chamber 64 is a first filter means 80. In this embodiment, as shown in FIG. 5, the first filter means 80 takes the form of a filter drum 82. The filter drum 82 has a width substantially equal to the internal width of the fourth chamber 64. Furthermore, the diameter of the filter drum 82 is substantially equal to the diameter of the substantially circular aperture 67.

The filter drum 82 has an internal bore 84. The internal bore 84 has a diameter slightly larger than the diameter of the first circular projection 72 and the second circular projection 78. When properly installed, the first circular projection 72 and the second circular projection 78 are received within the internal bore 84.

It is to be noted that the first chamber 46, third chamber 52 and fourth chamber 64 are positioned in serial along the y axis. The second chamber 48, however is located parallel to the fourth chamber 64 and part of the third chamber 52. The second chamber 48 has an open floor 86.

Each of the second housings 16 is of substantially identical construction. Accordingly, the common construction will be set out hereafter, with variations being mentioned once the common constructive elements have been fully described.

Each of the second housings 16 is also divided into an air conduit 88 and a plurality of chambers 90. The air conduit 88 is of identical length and width to second chamber 48. Each air conduit 88 has an open ceiling 92. The open ceiling 92 is of identical length and width to open floor 86.

Chambers 90 comprise a filtration chamber 94 and an air conditioning chamber 96. Each chamber 90 extends the full height of the second housing 16.

The filtration chamber 94 has an interior side 98 and an exterior side 100. The interior side 98 has three apertures 102 provided therein. Surrounding each aperture 102*a*, 102*b* are third circular projections 104. Aperture 102*c* is encapsulated by a circulation fan 106 contained within the filtration chamber 94.

The exterior side 100 has a cut-away portion 108. The cut-away portion 108 is shaped like two joined circles. The centre point of each of the joined circles is aligned with either aperture 102*a* or aperture 102*b*.

Figure 3:
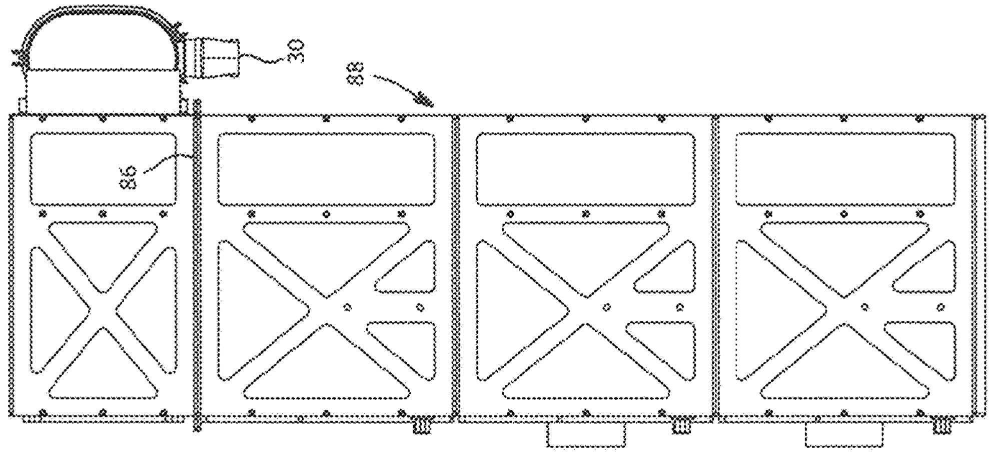
FIG. 3 is a side external view of the air conditioning and filtration system as shown in FIG. 1.
Figure 2:
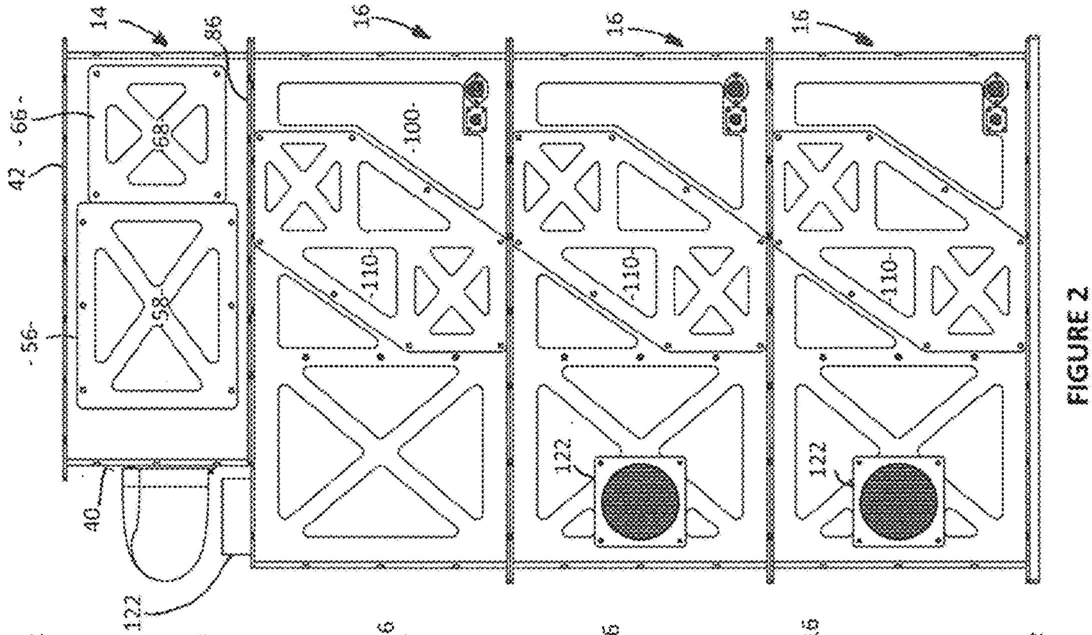
FIG. 2 is a front external view of the air conditioning and filtration system as shown in FIG. 1.

A cover 110 is adapted to overlay the cut-away portion 108. The cover 110 has a shape of an angled hexagon as shown in FIG. 2.

Extending from one side of the cover 110 are a pair of fourth circular projections 112. Fourth circular projections 112 are of equal diameter to third circular projections 104. Furthermore, the third and fourth circular projections 104, 112 are arranged to form a pair of vertically and horizontally aligned projections 104, 112.

Located within the filtration chamber 94 are second filter means 114. Second filter means 114 takes the form of a filter drum 116. The filter drum 116 has a width substantially equal to the internal width of the filtration chamber 94.

The filter drums 116 each have an internal bore 118. Each internal bore 118 has a diameter slightly larger than the diameter of a third circular projection 104 and its paired fourth circular projection 112. When properly installed, the third circular projection 104 and its paired fourth circular projection 112 are received within the internal bore 118.

Each aperture 102 allows air to flow from the filtration chamber 94 to the air conditioning chamber 96.

Air conditioning chamber 96 contains an air conditioning core 120. The specific arrangement, and method of operation, of the air conditioning core 120 is not necessary to the core principles of the invention and thus will not be discussed in more detail here.

Each air conditioning chamber 96 has an outlet 122. The position of the outlet 122 varies according to the ducting (not shown) necessary to deliver the air to the desired enclosed area 1.

When stacked on one another, the second housings 16 create a continuous air conduit 88. In order to do this the base second housing 16 has a solid floor 124, while each intermediate second housing 16 has an open floor 126.

This embodiment of the invention will now be described in the context of its intended use.

The air conditioning and filtration system 10 is installed at the desired location on a heavy vehicle (not shown). This includes connecting first ductwork (not shown) from at least one air conditioning vent (not shown) within the desired enclosed area 1 of the heavy vehicle to an outlet 122. It also includes connecting second ductwork (not shown) from at least one return vent (not shown) with the desired enclosed area 1 of the heavy vehicle to recirculating air inlet 38. Ideally, the second ductwork operates to channel air from each of the enclosed areas 1 to the recirculating air inlet 38.

Part of the installation of the air conditioning and filtration system 10 is to configure the pre-treatment system 12 such that atmospheric air inlet 18 is able to draw air from the external environment.

The air conditioning and filtration system 10 is also connected so as to receive power from the heavy vehicle's power unit.

With power supplied to the air conditioning and filtration system 10, each circulation fan 106 operates to draw in air. In this situation, air is drawn in by way of recirculating air inlet 38 and atmospheric air inlet 18.

Air drawn through the atmospheric air inlet 18 is first received by the cyclonic filtration system 20. The received air is then directed to one of the cyclonic particle separators 28. The centrifugal forces generated by the cyclonic particle separator 28 result in heavier contaminant particles being directed to the interior sides (not shown) of the cyclonic particle separator and, eventually, exit the cyclonic particle separator 28 to accumulate in the nozzle 30. The pre-treated air, i.e. the atmospheric air with the heavier contaminant particles removed, is then directed out of the cyclonic particle separator 28 by way of an outlet (not shown) as pre-treated air. The heavier contaminant particles can then be removed from the nozzle 30 as and when required.

The pre-treated air is then drawn from the outlet to the first chamber 46 by way of flexible conduit 22.

The pre-treated air enters the first chamber 46 by way of the central axis (not shown) of the pressurisation fan 50. The centrifugal forces generated by the pressurisation fan 50 imparts a positive pressure differential to the pre-treated air as it is expelled into the remainder of the first chamber 46.

The now pressurised pre-treated air travels from the first chamber 46 to the third chamber 52 by way of pressurisation inlet 60.

The position of the pressurisation inlet 60 means that the pressurised pre-treated air enters the third chamber 52 at its uppermost position. With the only exit from the third chamber 52 being filtration inlet 62, this means that the pressurised treated air must flow through each and every filtration cartridge installed in the third chamber 52.

It is to be noted here that the purpose of each filtration cartridge is to filter out one or more contaminants that may be found in the external environment. These contaminants will vary according to the environment in which the heavy vehicle operates, but the contaminants can potentially be caustic. As mentioned, in this embodiment, the filtration cartridge is designed to filter out sulphur dioxide ($SO_2$). In doing so the pressurised pre-treated air becomes further treated air.

The further treated air that enters the fourth chamber 64 is directed towards filter drum 82. As the circulation fans 106 continue to draw the treated air towards them, the treated air must pass through the filter drum 82 in order to exit the fourth chamber 64 by way of aperture 74.

The further treated air that exits the fourth chamber 64 by way of aperture 74 now meets up with the recirculated air in the second chamber 48 where it is allowed to mix. The recirculated air enters the second chamber 48 by way of recirculating air inlet 38. The combination of recirculated air and further treated air will hereafter be described as the air stream.

The air stream is pulled towards, and along, the air conduit 88 by way of the circulation fans 106. As the air stream travels along the air conduit 88, a portion thereof is drawn towards each of the circulation fans 106 by way of apertures 102*c*. Ideally, this results in the air stream being substantially uniformly distributed to the circulation fans 106.

The portion of the air stream drawn toward the circulation fans 106 is expelled more generally into the filtration chamber 94. The expelled air in the filtration chamber 94 must again pass through filter drums 116 in order to exit the filtration chamber 94 by way of either apertures 102*a*, 102*b*.

Air exiting the filtration chamber 94 by way of either aperture 102*a*, 102*b* enters the air conditioning chamber 96. The air conditioning core 120 then operates to heat, or cool, the air in the air conditioning chamber 96 as desired by the air conditioning settings (not shown) of the heavy vehicle. The air conditioning core 120 then expels the conditioned air from the air conditioning chamber 96 by way of outlet 122.

The conditioned air that exits by way of outlet 122 is then delivered to the intended enclosed area 1 by way of first ductwork and the air conditioning vents. The air within the enclosed areas 1 is then recirculated for additional filtration by way of return vents and second ductwork at which time it is processed as discussed above.

As mentioned above, the contaminants sought to be filtered out by the filtration cartridges may be caustic. As such, the filtration cartridges themselves may become damaged during normal operation resulting in elements of the filtration cartridge itself forming a potential contaminant. Thus, the position of the filter drums 82, 116 after the filtration cartridge(s) is advantageous as it can filter out particles released by the damaged filtration cartridge(s).

It is to be noted that each of the filtration cartridges (not shown) and the filter drums 82, 116 can be replaced as necessary. In the case of the filtration cartridges, removal is achieved by removing removable plate 58 to gain access to the third chamber 52. The filtration cartridge(s) needed to be replaced can then be slid along their respective ledges 54. Once replaced, or removed entirely, the filtration cartridges can again be secured in place by reattaching removable plate 58. This also acts to seal the third chamber 52.

In the case of the filter drums 82, 116, the process is slightly more involved. Depending on the filter drum 82, 116 to be replaced, either removable plate 68 or cover 110 is removed to expose either circular aperture 67 of cut-away side 66 or the cut-away portion 108 of exterior side 100.

Regardless of whether circular aperture 67 or cut-away portion 108 is exposed, access is then provided to either filter drum 82, 116 by which it can be axially removed. As the diameter of the circular aperture 67 or the relevant portion of the cut-away portion 108 is substantially equal to the diameter of the filter drum 82, 116, axial alignment with the first circular projection 72 or third circular projection 104 is maintained throughout the removal and insertion process.

Once the new filter drum 82, 116 has been inserted, the removable plate 66 or cover 110 is reinstalled such that either (a) second circular projection 78 aligns with internal bore 84; or (b) fourth circular projection 112 aligns with internal bore 118. In doing so, it is assured that the filter drum 82, 116 is properly positioned within either the fourth chamber 64 or filtration chamber 94, as appropriate.

It should also be appreciated by the person skilled in the art that the above invention is not limited to the embodiment described. In particular, the following modifications and improvements may be made without departing from the scope of the present invention:

While the invention has been described as being suitable for use with an enclosed area 1 in the form of a vehicle cabin, the invention is just as suitable for use with an enclosed area 1 forming part of any other form of stationary equipment or for other forms of housing. Furthermore, the invention as described may be used with both heavy vehicle equipment and light vehicle equipment.

While the invention has also been described in the context of circulation fans 106 to facilitate air movement, other systems may be employed to facilitate such movement without departing from the scope of the present invention.

Similarly, while the invention has been described primary in the context of the use of filters drums 82, 116 other types of filters may be used in place of, or in combination with, the filter drums 82, 116. For instance, sheet filters may be used.

In a similar fashion, the filter drums 82, 116 may be HEPA filters. In alternative arrangements, the filter drums 82, 116 may be active carbon filters and/or ultra-low penetration air filters. In a simpler version of the invention, where there is no concern for removal of contaminants at the sub-micron level and dust is the primary contaminant of concern, the drum filters 82, 116 may take the form of coarse filters.

The number and size of the circulation fans 106 may vary from that described above.

The flow requirement of the system 10 determines the number of filter drums 82, 116 required, which may be more or less than that described.

The pressurisation fan 50 may be replaced with other pressurisation devices, such as a pressurisation filter.

Replacement of the pressurisation fan 50 with other forms of pressurisation devices may also necessitate the inclusion of a fan or similar device for drawing air through the pressurisation device. Alternatively, existing fan structures may be increased in power to achieve this aim.

The filtration cartridges may be designed to filter out contaminants other than, or in addition to, sulphur dioxide. For instance, additional filtration cartridges may be installed to filter out contaminants such as ammonia, methane or diesel particulates.

Circular aperture 66 and/or cut-away portion 108 may be modified to include leverage slots 128. The leverage slots 128 can then be used to assist in removing one or more filter drums 82, 116. This is particularly useful in situations where a vacuum has formed in the fourth chamber 64 or filtration chamber 94 which prevents easy removal of the appropriate filter drum 82, 116.

Pre-treatment system 12 need not be external to the first housing 14. The implementation of the air conditioning and filtration system 10 in other vehicles, such as light vehicles, may allow for the pre-treatment system 12 to form a separate chamber 44 of the first housing 14.

It should be further appreciated by the person skilled in the art that the above variations and modifications, not being mutually exclusive, can be combined to form yet further embodiments that fall within the scope of the present invention.

I claim:

1. An air conditioning and filtration system comprising: a pre-treatment system for initially filtering air drawn from an external environment; pressurisation means downstream of said pre-treatment system and configured for positively pressurising air that has been filtered by the pre-treatment system; at least one circulation means, each circulation means operable to draw air from the external environment through the pre-treatment system and pressurisation means and air from at least one enclosed area, and to combine the air drawn from the external environment through the pre-treatment system and pressurisation means and air drawn from at least one enclosed area to generated a combined air stream; an air treatment set, each element of the air treatment set comprising a filtration means and an air conditioning means, each element of the air treatment set being housed in a stackable housing that is separate from said pre-treatment system; and wherein the combined air stream is directed to the air treatment set before being conveyed to at least one of the at least one enclosed areas, and wherein, when stacked, stackable units are in fluid communication with a head housing by way of a common air conduit, the head housing operable to house at least the pre-treatment system and the pressurisation means; wherein the filtration means in the air treatment set comprises drum filters; wherein the pre-treatment system comprises at least one cyclonic particle separator; wherein the pressurisation means system comprises either a pressurisation fan or a pressurisation filter; and wherein the circulation means comprises at least one circulation fan.

2. An air conditioning and filtration system according to claim 1, further comprising an at least one additional filtration means, the at least one additional filtration means operable to filter positively pressurised air before the positively pressurised air reaches the at least one circulation means.

3. An air conditioning and filtration system according to claim 2, wherein the at least one additional filtration means includes one or more filtration cartridges, each filtration cartridge operable to filter out a specific contaminant.

4. An air conditioning and filtration system according to claim 3, wherein the filtration cartridge is operable to filter out one of the group of contaminants consisting of: sulphur dioxide; ammonia; methane; and diesel particulate.

5. An air conditioning and filtration system according to claim 3, wherein each filtration cartridge is removably installed in a third chamber.

6. An air conditioning and filtration system according to claim 3, wherein the at least one additional filtration means includes at least one downstream filter, each downstream filter operable to further filter the positively pressurized air after the positively pressurized air has been filtered by one or more filtration cartridges.

7. An air conditioning and filtration system according to claim 6, wherein each downstream filter is one of the group consisting of: an active carbon filter; an ultra low penetration air filter; and a coarse liner filter.

8. An air conditioning and filtration system according to claim 6, wherein each downstream filter is a drum filter.

9. An air conditioning and filtration system according to claim 8, further comprising at least one leveraging means for facilitating removal of the drum filter.

10. An air conditioning and filtration system according to claim 9, wherein the at least one leveraging means comprises a leveraging slot.

11. An air conditioning and filtration system according to claim 1, further comprising at least one leveraging means for facilitating removal of a drum filter.

12. An air conditioning and filtration system according to claim 11, wherein the leveraging means is a leveraging slot.

* * * * *